United States Patent
Tian et al.

(10) Patent No.: US 10,178,707 B2
(45) Date of Patent: Jan. 8, 2019

(54) SYSTEMS AND METHODS TO PROVIDE WIRELESS ACCESSORY BACKUP COMMUNICATION LINKS

(71) Applicant: MOTOROLA SOLUTIONS, INC., Chicago, IL (US)

(72) Inventors: Yong Tian, SiChuan (CN); Da-jun Chen, SiChuan (CN); Xun Fei, SiChuan (CN); Dong Zhao, SiChuan (CN); Kang-Kai Zhao, SiChuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 56 days.

(21) Appl. No.: 15/525,020

(22) PCT Filed: May 13, 2016

(86) PCT No.: PCT/CN2016/082102
§ 371 (c)(1),
(2) Date: May 5, 2017

(87) PCT Pub. No.: WO2017/193391
PCT Pub. Date: Nov. 16, 2017

(65) Prior Publication Data
US 2018/0206285 A1    Jul. 19, 2018

(51) Int. Cl.
*H04W 76/19*     (2018.01)
*H04W 36/00*     (2009.01)
*H04M 11/04*     (2006.01)

(52) U.S. Cl.
CPC .......... *H04W 76/19* (2018.02); *H04W 36/00* (2013.01); *H04M 11/04* (2013.01)

(58) Field of Classification Search
CPC ...... H04W 36/00; H04W 76/19; H04M 11/04
See application file for complete search history.

(56) References Cited

U.S. PATENT DOCUMENTS 7,630,323 B2   12/2009  Bridgelall
8,086,287 B2   12/2011  Mooney et al.
(Continued)

FOREIGN PATENT DOCUMENTS

CN   101938298   1/2011
CN   105302635   2/2016
(Continued)

OTHER PUBLICATIONS

PCT/CN20161082102 International Search Report and Written Opinion of the International Searching Authority dated Jan. 25, 2017 (9 pages).

*Primary Examiner* — Raymond Dean
(74) *Attorney, Agent, or Firm* — Michael Best & Friedrich LLP

(57) ABSTRACT

A communications system and method of operation thereof. The communications system includes a communication network, a plurality of subscriber units and accessories, and a communications server. Each of the plurality of accessories are associated with and linked to one of the of subscriber units by a wireless connection. The communications server communicates with the plurality of subscriber units via the communication network, and is configured to obtain and maintain a plurality of data on each of the plurality of subscriber units, and generate a backup list identifying secondary subscriber units to which each of the plurality of accessories can link. Upon detecting a condition where communication drops below a desired level of service, the communication server is configured to identify a secondary subscriber unit from the first accessory's backup list and instruct the secondary subscriber unit to link with the first accessory.

20 Claims, 6 Drawing Sheets

(56) References Cited

U.S. PATENT DOCUMENTS

| | | |
|---|---|---|
| 8,774,060 B2 | 7/2014 | Bryant |
| 2002/0160820 A1 | 10/2002 | Winkler |
| 2006/0003785 A1 | 1/2006 | Zatezalo |
| 2012/0159617 A1* | 6/2012 | Wu ....................... G06F 21/445 |
| | | 726/19 |
| 2014/0097934 A1 | 4/2014 | Su et al. |
| 2016/0119745 A1 | 4/2016 | Choi |
| 2017/0127018 A1* | 5/2017 | Li ........................... H04N 7/15 |

FOREIGN PATENT DOCUMENTS

| | | |
|---|---|---|
| EP | 3007416 | 4/2016 |
| GB | 2445395 | 7/2008 |

* cited by examiner

| FIRST ACCESSORY 120 BACKUP LIST | | | | | |
|---|---|---|---|---|---|
| PRIORITY | ID | TALK GROUP | DISTANCE | ASSIGNMENT | ROLE |
| 1 | SU220 | 1 | 2 | SEARCH SUSPECT | MEMBER |
| 2 | SU4 | 1 | 3 | SEARCH SUSPECT | MEMBER |
| 3 | SU6 | 1 | 5 | MEDICAL | MEMBER |
| 4 | SU8 | 3 | 4 | COLLECT EVIDENCE | MEMBER |
| 5 | SU1 | 3 | 6 | COLLECT EVIDENCE | MEMBER |
| 6 | SU7 | 2 | 3 | SEARCH SUSPECT | SUPERVISOR |
| 405 | 410 | 415 | 420 | 425 | 430 |

FIG. 4

SYSTEMS AND METHODS TO PROVIDE WIRELESS ACCESSORY BACKUP COMMUNICATION LINKS

BACKGROUND OF THE INVENTION

As portable communication devices become increasingly prevalent, use of accessories (for example, wireless headsets, microphones, cameras, and the like) with these devices also increases. In public safety scenarios (for example, communications involving police, fire fighters, first responders, and the like) accessories may be associated with communication devices used for communications that may be both critical and highly confidential.

Unexpected events or changing circumstances, such as a broken short range communication link between a communication device and an accessory, may result in an interruption in communications made via the accessory.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is an exemplary backup list in accordance with some embodiments.

Figure 1:
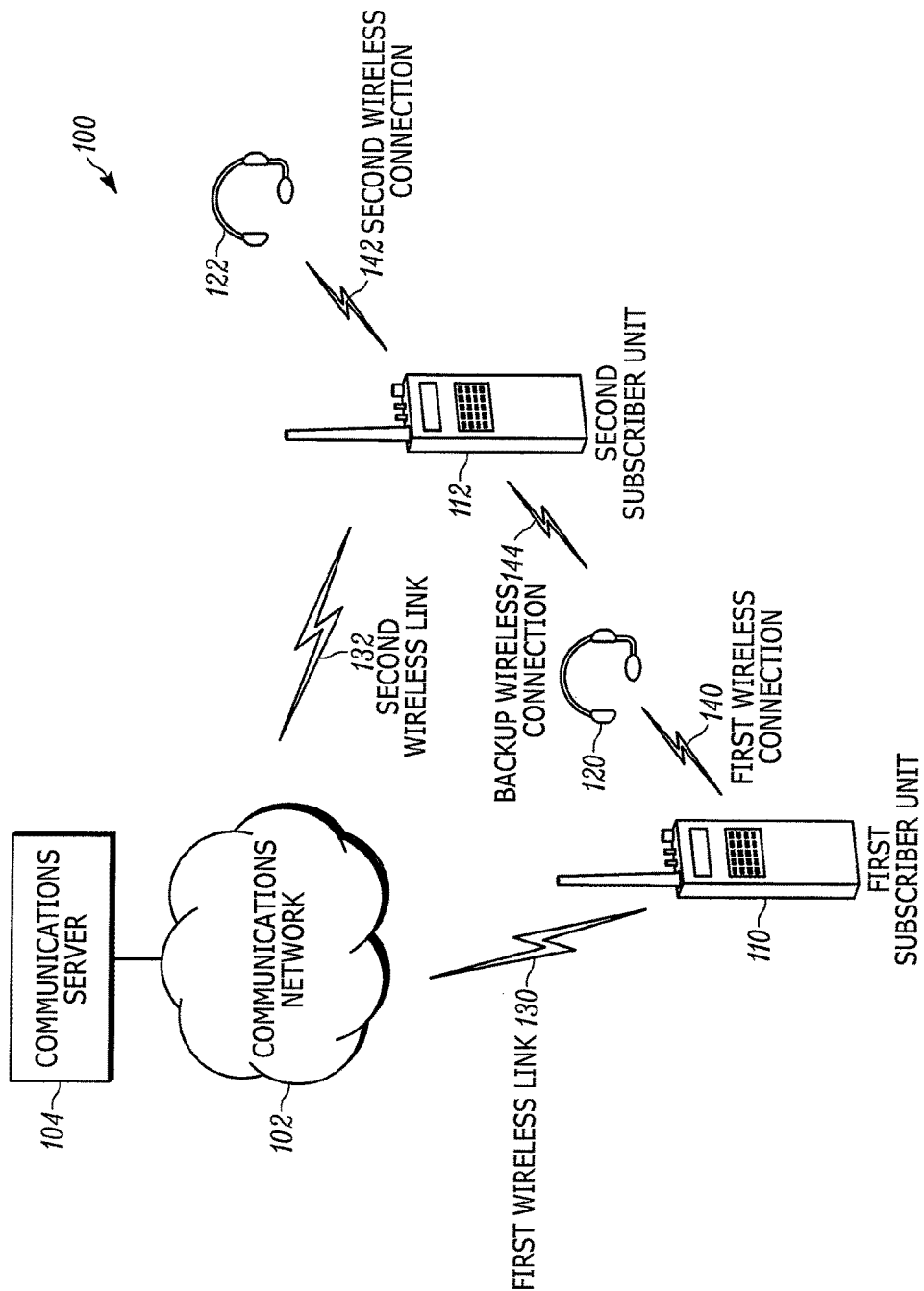
FIG. 1 is a diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments provide a secondary or backup communication link for a wireless an accessory when the communication link between an accessory and associated communication device has been broken.

One particular embodiment provides a system to provide a backup communication link for a wireless accessory. In one example, the system includes a communication network, a plurality of subscriber units, a plurality of accessories, and a communications server. Each of the plurality of accessories are associated with one of the of subscriber units and linked to the one of the plurality of subscriber units by a wireless connection. The communications server communicates with the plurality of subscriber units via the communication network, and is configured to obtain and maintain a plurality of data on each of the plurality of subscriber units. The plurality of data includes each subscriber unit's location and each subscriber unit's currently associated accessories. The communications server is also configured to generate a backup list identifying secondary subscriber units to which each of the plurality of accessories can link, and upon detecting a condition where communication between the communications server and a first accessory associated with a primary subscriber unit drop below a desired level of service, to identify a secondary subscriber unit from the first accessory's backup list and instructs the secondary subscriber unit to link with the first accessory.

Another embodiment provides a method of linking accessories and subscriber units in a communication system having a communications server communicating to a plurality of subscriber units via a network, where each of the plurality of subscriber units is associated with one or more of a plurality of accessories. In one example, the method includes obtaining and maintaining, by the communications server, a plurality of data on each of the plurality of subscriber units, the plurality of data including a location of each subscriber unit. The method also includes generating, by the communications server, a backup list for each of the plurality of accessories identifying which of the plurality of subscriber units can link to each of the plurality of accessories. Upon detecting a condition preventing communication between the communications server and a first accessory associated with a primary subscriber unit, the communications server identifies a secondary subscriber unit from a backup list of the plurality of backup lists associated with the first accessory and instructs the secondary subscriber unit to link with the first accessory.

FIG. 1 is a diagram of one exemplary embodiment of a communications system 100 for providing wireless communication. In the illustrated embodiment, the communications system 100 is a public safety land mobile radio (LMR) network and may be, for example, implemented in accordance with the Association of Public Safety Communications Officials (APCO) "Project 25" (P25) two-way radio communications protocol. In alternative embodiments, the communications system 100 may operate using other communications protocols and standards (for example two-way radio, cellular, and so on). The communications system 100 includes a communications network 102, a communications server 104, a first subscriber unit 110, a second subscriber unit 112, a first accessory 120, and a second accessory 122. For ease of description, the communications system 100 is illustrated with a single first subscriber unit 110 and its associated first accessory 120, and a single second subscriber unit 112 and its associated second accessory 122. This should not be considered limiting. Alternative embodiments may include more of each of these components, may combine some components, or may include other alternative components. For example, the systems and methods described herein may be implemented with alternative embodiments of the communications system 100, which include more than two subscriber units having one or more associated accessories. In addition, the communications server 104 may be an individual device or may be distributed over multiple devices. In addition, the the communications server 104 may be embodied in one or more of the subscriber units.

In the illustrated embodiment, the communications network 102 may be all or part of a land-mobile radio network or other network such as a cellular telephone network, and may include, for example, a base station including antennas, transmitters, receivers, controllers, and other equipment configured to provide wireless communications to the first subscriber unit 110, the second subscriber unit 112, the first accessory 120, the second accessory 122, as well as other mobile and portable two-way radios and other types of electronic communication devices.

The communications server 104 controls the operations of some or all of the communications network 102, and includes, among other things, an electronic processor (for example, a microprocessor or another suitable programmable device), a memory (or other computer-readable storage medium), and an input/output interface (not shown). The electronic processor, the memory, and the input/output interface, as well as the other various modules are connected by one or more control or data buses. The processor is coupled to the memory and executes computer readable code ("software") stored in the memory. The software may include firmware, one or more applications, program data, filters, rules, one or more program modules, and/or other executable instructions. The processor is configured to retrieve from the memory and execute, among other things, instructions related to the processes and methods described herein.

In the illustrated embodiment, the first subscriber unit 110 and the second subscriber unit 112 are portable two-way radios. In alternative embodiments, the first subscriber unit 110 and the second subscriber unit 112 may be mobile two-way radios, cellular telephones, smart telephones, or other electronic communications devices that include, or are capable of being coupled to, a network modem or components to enable wireless network communications (such as an amplifier, antenna, and the like) to the communications network 102. The first subscriber unit 110 is communicatively coupled to the communications network 102 by a first wireless link 130, and the second subscriber unit 112 is communicatively coupled to the communications network 102 by a second wireless link 132.

The first accessory 120 and the second accessory 122 may be audio devices (for example, speakers, microphones, headsets, ear buds, and the like), video devices (for example, display screens and cameras), or other input/output devices (for example, a keypad, a touchpad, and the like). The first accessory 120 and the second accessory 122 wirelessly pair and communicate with wireless communication devices such as, for example, the first subscriber unit 110 and the second subscriber unit 112. As illustrated, the first accessory 120 and the second accessory 122 are associated with (that is, preferably paired with) the first subscriber unit 110 and the second subscriber unit 112, respectively. The first accessory 120 is linked to the first subscriber unit 110 by a first wireless connection 140. Likewise, the second accessory 122 is linked to the second subscriber unit 112 by a second wireless connection 142. The first accessory 120 and the second accessory 122 enable users of the first subscriber unit 110 and the second subscriber unit 112 to communicate to other elements of the communications system 100.

The first wireless connection 140 and the second wireless connection 142 may be established, for example, using Bluetooth® or another wireless protocol. As can be appreciated by one skilled in the art, when the distance between two paired devices exceeds a maximum distance (for example, Bluetooth® links provide wireless connections over a distance of about thirty-two feet), the wireless connection between the devices will break (as used herein, breaking or interrupting the wireless connection connotes a level of service that is deemed unreliable—that is the quality of the wireless connection fails to meet a desired level of service). Accordingly, the first wireless connection 140 is broken or interrupted when the first accessory 120 is more than a maximum distance from its associated first subscriber unit 110. The first wireless connection 140 may be broken or interrupted by other causes, such as malfunctioning hardware or software, or electromagnetic interference. The second wireless connection 142 may be similarly broken or interrupted.

As described in greater detail below, the first accessory 120 and the second accessory 122 can be controlled to pair with electronic devices other than the one to which they are associated (that is the first and second accessories 120 and 122 can be linked to other electronic devices). For example, when the first wireless connection 140 is broken or interrupted, the communications server 104 may direct the second subscriber unit 112 to link with the first accessory 120 via a backup wireless connection 144. The first accessory 120 is thereby re-linked to the communications network 102 via the second wireless link 132. Thus, for example, a user of the first subscriber unit 110 and the first accessory 120 would be able to continue communicating with other elements of the communications system 100 via the second subscriber unit 112, when disconnected from the first subscriber unit 110.

Figure 2:
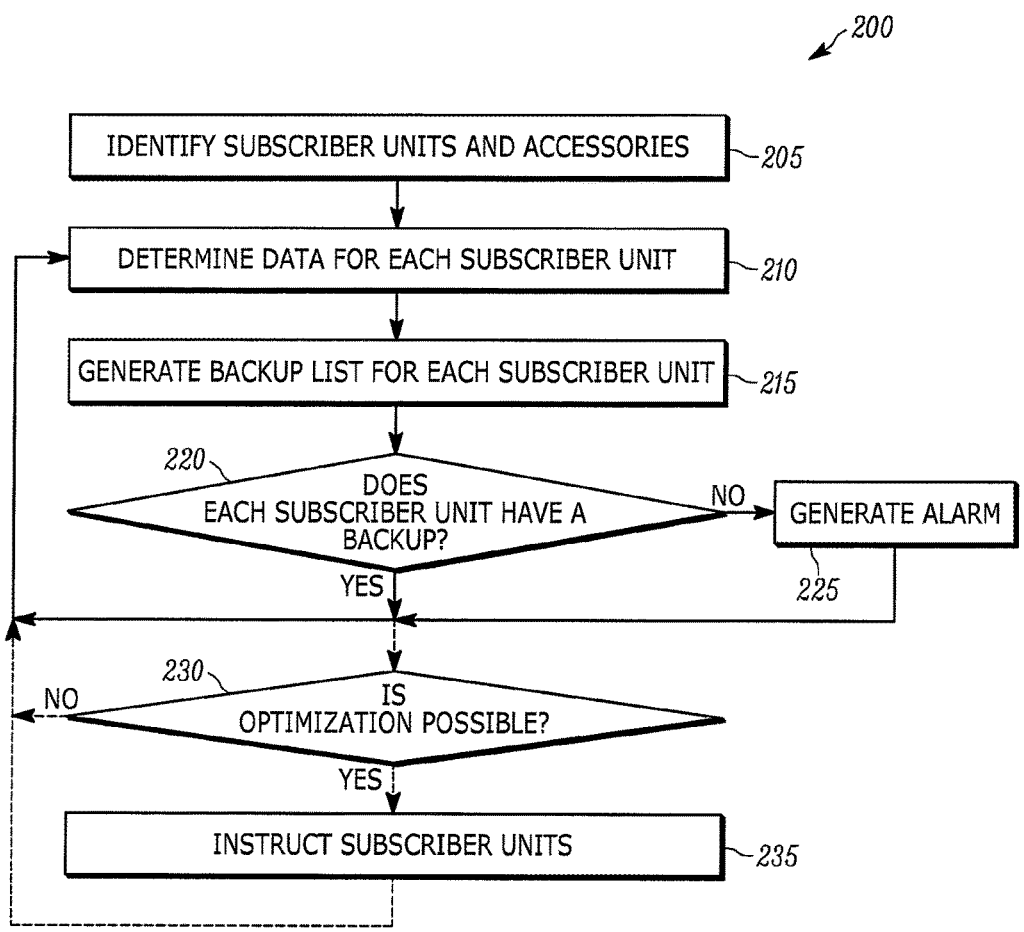
FIG. 2 a flowchart of a method for generating a backup list and optimization for the communication system of FIG. 1 in accordance with some embodiments.

FIG. 2 is a flow chart of an exemplary method 200 for generating a backup list. As noted above, embodiments of the communications system 100 include two, three, or more subscriber units and associated accessories. In such embodiments, the communications server 104 generates and maintains a plurality of backup lists—one for each subscriber unit and its associated accessory or accessories. Each of the plurality of backup lists, as described in detail below, may be used by the communications server 104 to establish a backup wireless connection 144. For example, a backup list for the first subscriber 110 includes a list of potential backup wireless connections (that is, links), which links may be established between the first accessory 120 and one or more other subscriber units (for example, the second subscriber unit 112). As described in detail below, when the communications server 104 cannot communicate with the first accessory 120 (for example, because the first wireless connection 140 between the first accessory 120 and the first subscriber unit 110 is broken), it controls elements of the communications system 100 to establish one or more of the backup links to the first accessory 120. When the communications system is operating with all accessories linked to the subscriber units to which they are associated, each of the plurality of subscriber units may be viewed as a primary subscriber unit (for example, the first subscriber unit 110) by their associated accessory (for example, the first accessory 120). As set forth in detail below, the communications server 104 will generate a backup list including a plurality of the plurality of primary subscriber units for each of the plurality of accessories.

At block 205, the communications server 104 identifies the subscriber units and their associated accessories, with which it is in communication. For example, referring to FIG. 1, the communications server 104 is in communication with the first subscriber unit 110 and the second subscriber unit 112 over the first wireless link 130 and the second wireless link 132, respectively. Similarly, the communications server 104 is in communication with the first accessory 120 (via the first wireless connection 140 and the first subscriber unit 110) and the second accessory 122 (via the second wireless connection 142 and the second subscriber unit 112).

Returning to FIG. 2, at block 210, the communications server 104 determines a plurality of data for each subscriber unit identified at block 205. The plurality of data is related to each subscriber unit, and may include the location of each subscriber unit, an assignment of the user of each subscriber unit (for example, in a public safety environment, a police officer may be assigned to pursuing a suspect, administering medical attention to a victim, gathering evidence, and the like), a role of the user of each subscriber unit (for example, a group leader or supervisor, a member of a group, and the like), a talk group for the subscriber unit (for example, a talk group for an investigation occurring at a specific site), as well as other data regarding the operational status of the subscriber unit, or the activities in which the user of the subscriber unit is engaged. The plurality of data may also include the currently-associated accessories for the subscriber unit.

At block 215, the communications server 104 generates a backup list for each subscriber unit identified at block 205. As is described in more detail herein, the communications server 104 prioritizes each backup within the list based on the plurality of data determined at block 210. At block 220, the communications server 104 determines whether each of the subscriber units identified in block 205 has a possible backup link. That is, the communications server 104 determines whether there is another subscriber unit that the first accessory 120 could be linked to. When there is no possible backup link, the communications server 104 may generate a notification at block 225. For example, referring to FIG. 1, the second subscriber unit 112 may not be in range of the first accessory 120 (as determined, for example, by the respective locations of the two determined at block 210). Because there is no back up link available, an alarm may, for example, inform a supervisor that the first subscriber unit 110 has moved out of the communications range of the other subscriber units in the communications system 100 (in this example, the second subscriber unit 112). In such case, the supervisor may determine that any interruptions in communications from the first subscriber unit 110 should be investigated by, for example, sending other personnel to the last known location of the first subscriber unit 110.

Returning to FIG. 2, after generating the alarm, or when each of the subscriber units identified in block 205 has a possible backup link, the communications server 104 continues the method 200 at block 210. In some embodiments, at block 230, the communications server 104 reviews the backup lists to determine if it is possible to optimize the links (for example, the first wireless connection 140 and the second wireless connection 142) between the accessories and the subscriber units. For example, because the subscriber units may operate on battery power, if a number of accessories can link to a single subscriber unit, the remaining subscriber units are able to go into a power saving mode. In such embodiments, when the communications server 104 determines that optimization is possible, the communications server 104 instructs the appropriate subscriber units to link to the one or more accessories, which result in the optimization, at block 235. Whether or not optimization is performed, the communications server 104 continues the method 200 at block 210. One type of the desired level of service of wireless connections may be considered the efficient utilization of devices or bandwidth. Thus, optimization may be performed when condition exists where the desired level of service of the wireless connections is not efficient.

Figure 3:
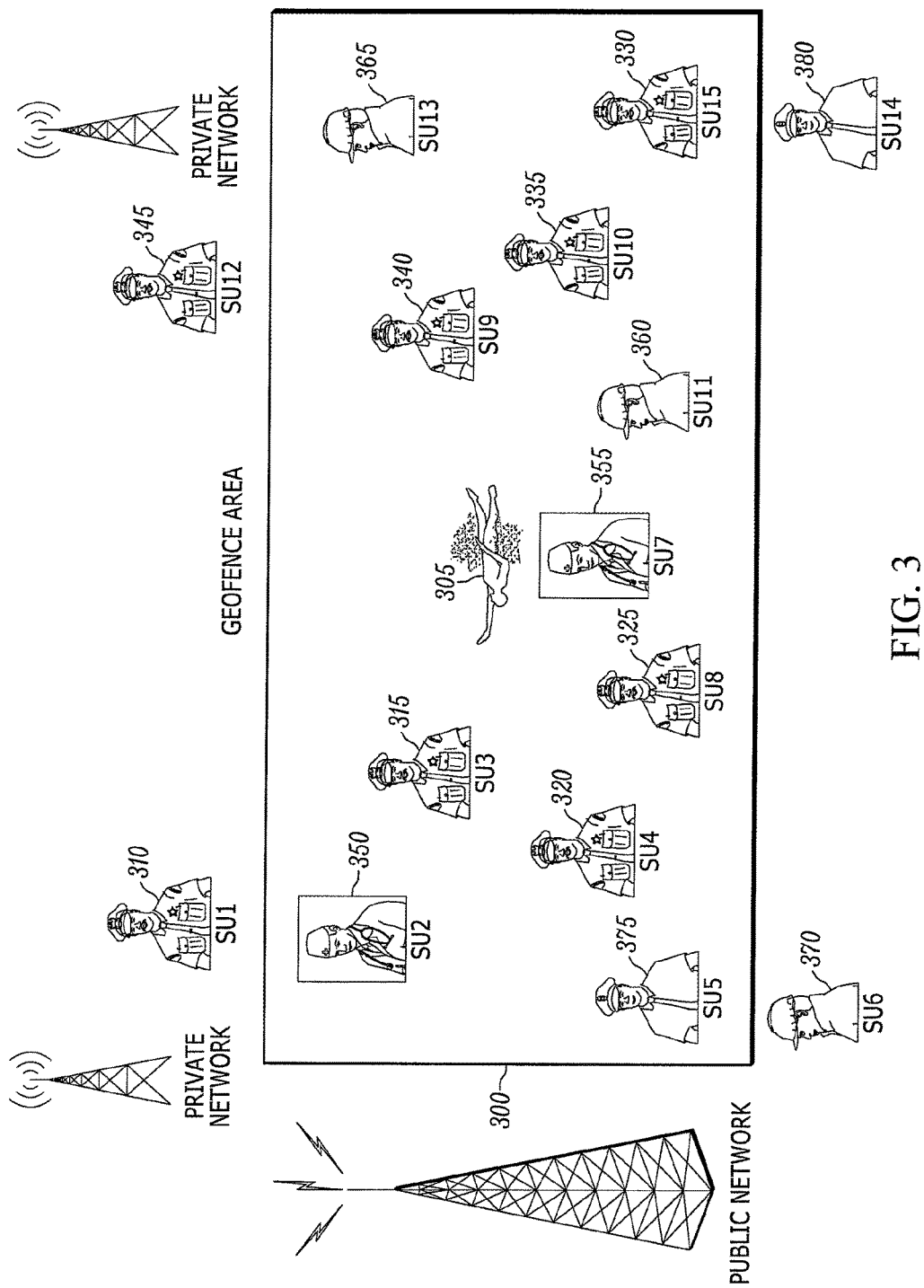
FIG. 3 is an illustration of a situation employing the backup lists, relinking, and optimization in accordance with some embodiments.

In some embodiments, the communications server 104 may employ a geo-fence (that is, a geographical area defined by virtual boundaries) to make define and establish backup links and perform optimizations. FIG. 3 illustrates an exemplary geo-fence 300, in and around which a plurality of subscriber units are operating. In the example shown, the geo-fence 300 exists around a plurality of personnel having subscriber units and responding to an incident 305. The plurality of personnel may include police officers 310, 315, 320, 325, 330, 335, 340, and 345, emergency medical technicians 350 and 355, fire fighters 360, 365, and 370, and supervisors 375 and 380. Each of the plurality subscriber units are assigned to one or more talk groups (TGs).

In the illustrated example, the communications server 104 knows all the members of the talk group, and generates backup lists for each subscriber unit, according to the method 200 described above. As discussed above. the communications server 104 may optimize the accessories deployed within geo-fence 300. For example, the accessories of each of the personnel may be optimized to link to one of the subscriber units of the four personnel at or near the corners of the geo-fence 300 (for example, the emergency medical technician 350, the firefighter 365, the supervisor 375, and the officer 330). Because of their locations, the subscriber units of the personnel at the corners of the geo-fence 300 would be close enough to all of the personnel within the geo-fence 300 to allow the accessories of all of the personnel within the geo-fence 300 to link to the subscriber units of the four personnel at the corners of the geo-fence 300.

In another example, optimization involves determining the smallest number of subscriber units that can cover the entire geo-fence 300 and linking all of the accessories to these subscriber units. For example, when the geo-fence 300 is small enough, all of the accessories could be linked to a subscriber unit near the center of the geo-fence 300 (for example, the subscriber unit of officer 335). The communications server 104 may take into account factors other than location when performing optimizations. For example, the supervisor 375 may be excluded from the optimization to ensure the supervisor's 375 accessory has sufficient bandwidth to maintain a communication link to the communications server 104.

At the location of the incident 305, outliers may exist (for example, personnel outside of the geo-fence 300), as illustrated in FIG. 3. These outliers may be positioned far enough away from the other subscriber units that there is no backup link available for their associated accessories. As described above in the method 200, this may trigger an alarm.

FIG. 4 illustrates an exemplary backup list 400 for the first accessory 120. As described above, the backup list 400 is generated by the communications server 104 using the method 200 from a plurality of subscriber units (for example, as illustrated in FIG. 3). The communications server 104 generates the backup list 400 including information for each subscriber unit that the first accessory 120 may be able to link to.

The backup list 400 shown includes the following data for each subscriber unit:
 a priority 405,
 a radio identification 410,
 a talk group identification 415,
 a distance 420,
 an assignment 425, and
 a role 430.

The priority 405 is a ranking of the subscriber units in the backup list 400 indicating, from highest to lowest, the subscriber units the first accessory 120 should link to in the event that the first wireless connection 130 is broken (or for purposes of optimization).

The subscriber unit identification 410 is a unique identifier for the subscriber unit in the backup list 400. This can be, for example, a serial number of the subscriber unit or other identifier.

The talk group identification 415 identifies which talk group the subscriber unit is a member of. The talk group may be the same or different than the talk group the first accessory 120 is a member of.

The distance 420 is the distance between the first accessory 120 and the subscriber unit. In the example shown, subscriber unit SU3 is two meters from the first accessory 120.

The assignment 425 is the task assigned to the user of the subscriber unit.

The role 430 is the role of the user of the subscriber unit.

In some embodiments, the communications server 104 weights each of the data and, using the weighted data, determines the priority 405 of each radio in the backup list 400. For example, the distance 420 may be weighted more heavily to help ensure that the first accessory 120 is near to the subscriber unit to reduce the likelihood that the subscriber unit will move away from the first accessory 120 (thus breaking the wireless connection).

In the example illustrated, the talk group 415, the assignment 425, and the role 430 are also taken into account in assigning the priority 405. For example, a subscriber unit that is pan of the same talk group, has a similar assignment, and/or a similar role as the first accessory 120 may be more likely to remain physically close to the first accessory 120. Such a subscriber unit is therefore more likely to provide an uninterrupted wireless connection to the first accessory 120 for an extended period of time.

An empty backup list 400 indicates that another subscriber unit is not near the first accessory 120. In some circumstances this may be a warning sign (for example, in public safety scenarios where users are paired with at least one other individual). In such a circumstance, the communications server 104 may provide an indication of the empty backup list to, for example, the supervisor 375.

In some embodiments, when linking the first accessory 120 with a new subscriber unit, any properties (for example, communication properties) are carried over to the new subscriber unit. This may include the first accessory 120 receiving only communications intended for the first subscriber unit 110 because the first accessory 120 was originally associated with the first subscriber unit 110.

Figure 5:
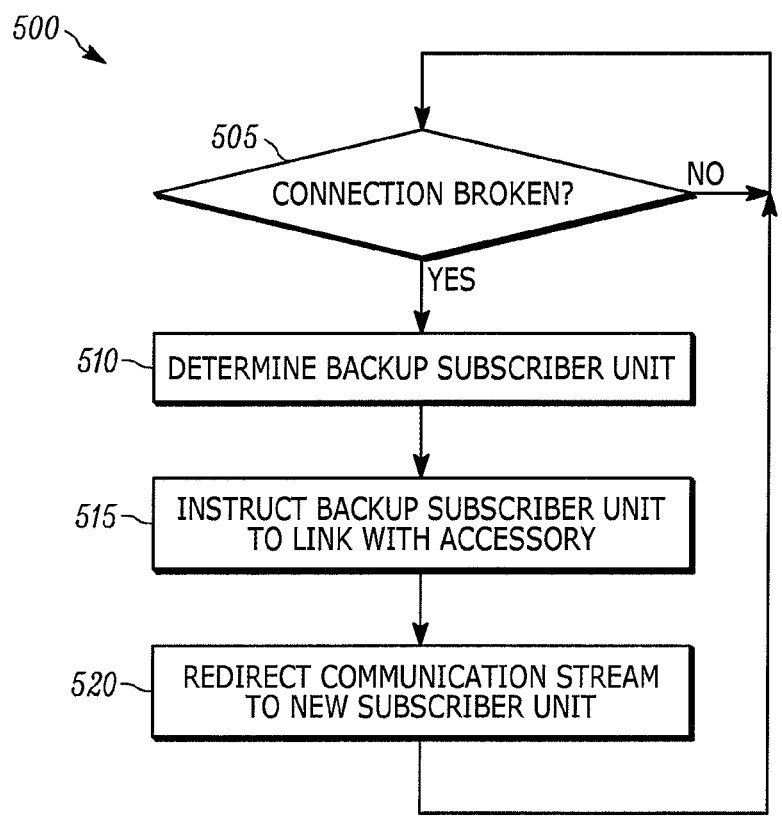
FIG. 5 a flowchart of a method of a relinking operation in accordance with some embodiments.

FIG. 5 is a flow chart illustrating an exemplary method 500 for providing a backup communication link for a wireless accessory in the communications system 100. In the example described, the first accessory 120 is provided with a backup communication link. This should not be considered limiting. The methods described herein could be used to provide a backup communication link to the second accessory 122, or to multiple accessories within the communications system 100. Furthermore, the methods may be implemented with a variety of accessories and subscriber units, and in other situations where communications between accessories and subscriber units might be interrupted or broken.

At block 505, the communications server 104 determines whether the first wireless connection 140 has been broken (that is. where there is some condition preventing communication between the communications server 104 and the first accessory 120). For example, the communications server 104 may determine that the first wireless connection 140 has been broken when it can no longer communicate with the first accessory 120. When the first wireless connection 140 has not been broken, the communications server 104 continues to determine whether it is broken, at block 505.

When the first wireless connection 140 has been broken, the communications server 104 determines a secondary subscriber unit (that is, a backup subscriber unit) for the first accessory 120, at block 510. For example, the communications server 104 may review the backup list 400 for the first accessory 120 to identify a subscriber unit to which the first accessory 120 can link. In some embodiments, the communications server 104 selects (or assigns) the subscriber unit from the backup list 400 based on the priority. When the highest priority radio is not acceptable or available (for example, when the communications server 104 cannot communicate with highest priority subscriber unit or the highest priority subscriber unit cannot link to the first accessory 120), the communications server 104 selects the next highest priority the first wireless connection 140 until a suitable the first wireless connection 140 is found.

At block 515, the communications server 104 instructs the subscriber unit to link to the first accessory 120. For example, as illustrated in FIG. 1, the second subscriber unit 112 establishes a backup wireless connection 144 with the first accessory 120. In some embodiments, the communications server 104 directs communications intended for the first subscriber unit 110, and, thus, the first accessory 120, to the second subscriber unit 112, now linked to the first accessory 120. From the standpoint of the user, the redirection of communications will provide the same communications capability as if the user were still using his or her original subscriber unit.

Figure 6:
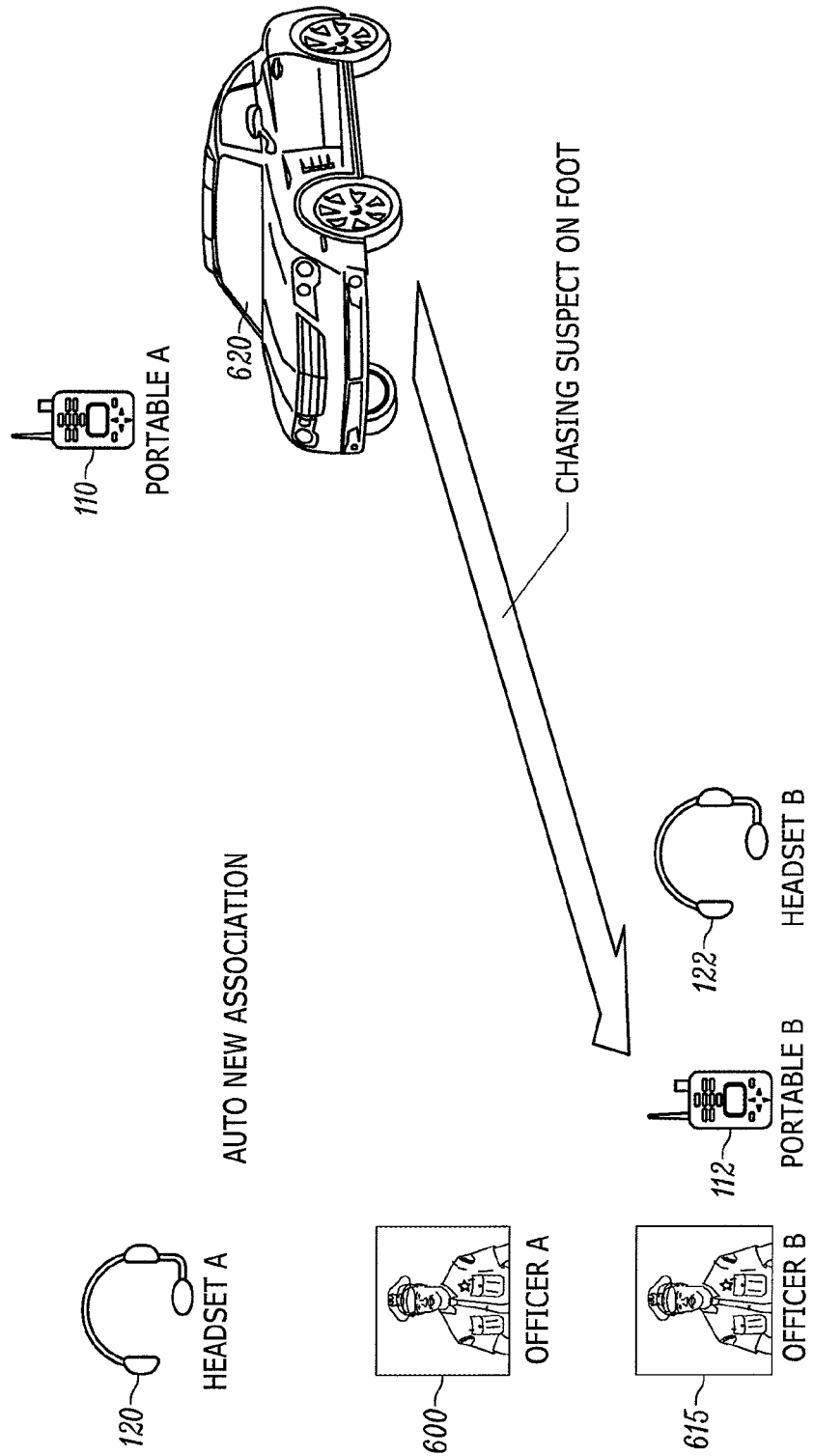
FIG. 6 is an illustration of an example where a wireless connection between a radio and accessory is broken.

For example, consider two police officers each using wireless headsets and portable radios during a foot chase. As illustrated in FIG. 6, an Officer A 600 is the user of the first subscriber unit 110 and the first accessory 120 (as illustrated, a wireless headset A). An Officer B 605, the partner of the Officer A 600, is the user of the second subscriber unit 112 and the second accessory 122 (as illustrated, a wireless headset B). The Officer A 600 and the Officer B 615 jump out of their patrol car 620 together to give chase to a suspect on foot. Officer A 600 leaves the first subscriber unit 110 in the patrol car 620 inadvertently. The connection between the first subscriber unit 110 and the first accessory 120 is broken when the distance between the Officer A 600 and the patrol car 620 exceeds the range of the first wireless connection 140. This results in an interruption of the communications of the Officer A 600 via the first subscriber unit 110.

Because Officer A 600 and Officer B 615 remain close to one another during the pursuit of the suspect, it the second subscriber unit 112 will be on the backup list for the first accessory 120. Using the methods described herein, the communications server 104 directs the second subscriber unit 112 to link to the first accessory 120. Accordingly, the communications to and from the Officer A 600 may be relayed via second subscriber unit 112.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system to provide a backup communication link for a wireless accessory, the system comprising:
   a communications network;
   a plurality of primary subscriber units;
   a plurality of accessories each associated with one of the of plurality of primary subscriber units and linked to the one of the plurality of primary subscriber units by a wireless connection; and
   a communications server communicating with the plurality of primary subscriber units via the communications network, the communications server configured to obtain and maintain a plurality of data on each of the plurality of primary subscriber units, the plurality of data including a location of each of the plurality of subscriber units and the currently-associated accessories for each of the primary subscriber units;
   wherein the communications server is configured to generate a plurality of backup lists, each identifying which of the plurality of subscriber units each of the plurality of accessories can link with; and
   upon detecting a condition wherein communication between the communications server and a first accessory associated with a primary subscriber unit drops below a desired level of service, the communication server is configured to identify a secondary subscriber unit from the backup list of the first accessory, and instruct the secondary subscriber unit to link with the first accessory by establishing a backup wireless connection to the first accessory.

2. The system of claim 1, wherein the condition is a broken wireless connection between the primary subscriber unit and the first accessory.

3. The system of claim 1, wherein each of the plurality of primary subscriber units is associated with a talk group and the plurality of data includes the talk group.

4. The system of claim 1, wherein the plurality of data includes a distance between each of the plurality of primary subscriber units and the first accessory.

5. The system of claim 1, wherein the plurality of data includes at least one selected from a group consisting of an assignment and a role of a user of each of the plurality of primary subscriber units.

6. The system of claim 1, wherein the communications server assigns a priority to each subscriber unit in each of the plurality of backup lists.

7. The system of claim 6, wherein the priority of each of the primary subscriber units is based on a weighting of the plurality of data for each primary subscriber unit in the plurality of backup lists.

8. The system of claim 6, wherein the communications server selects the primary subscriber unit with the highest priority as the secondary subscriber unit, and when the selected secondary subscriber unit is not able to link to the first accessory, the communications server selects a next highest priority primary subscriber unit to link to the first accessory.

9. The system of claim 1, wherein the condition is a defective primary subscriber unit.

10. The system of claim 1, wherein the condition is an optimization of the plurality of accessories and includes the communication server linking one of the plurality of primary subscriber units with a plurality of the plurality of accessories.

11. The system of claim 1, wherein the communication server is embodied in one or more of the plurality of primary subscriber units.

12. A method for linking accessories and subscriber units in a communications system having a communications server communicating to a plurality of primary subscriber units via a network, each of the plurality of primary subscriber units having an associated one or more of a plurality of accessories, the method comprising:
obtaining and maintaining, by the communications server, a plurality of data on each of the plurality of primary subscriber units, the plurality of data including a location of each primary subscriber unit;
generating, by the communications server, a backup list for each of the plurality of accessories identifying which of the plurality of primary subscriber units can link to each of the plurality of accessories; and
upon detecting, by the communications server, a condition preventing communication between the communications server and a first accessory associated with a primary subscriber unit;
identifying, by the communications server, a secondary subscriber unit from a backup list of the first accessory; and
instructing the secondary subscriber unit to link with the first accessory by establishing a backup wireless connection to the first accessory.

13. The method of claim 12, wherein the condition is a broken wireless connection between the primary subscriber unit and the first accessory.

14. The method of claim 12, wherein each of the plurality of primary subscriber units is associated with a talk group and the plurality of data includes the talk group.

15. The method of claim 12, wherein the plurality of data includes a distance between each of the plurality of primary subscriber units and the first accessory.

16. The method of claim 12, wherein the plurality of data includes at least one selected from a group consisting of an assignment and a role of a user of each of the plurality of primary subscriber units.

17. The method of claim 12, further comprising assigning, by the communications server, a priority to each of the primary subscriber units in each of the plurality of backup lists, wherein the priority of each of the subscriber units is based on a weighting of the plurality of data for each primary subscriber unit in the backup list, and
wherein the communications server selects a primary subscriber unit with the highest priority as the secondary subscriber unit, and
when the selected secondary subscriber unit is not able to link to the first accessory, the communications server selects a subscriber unit of the plurality of primary subscriber units with the next highest priority to link to the first accessory.

18. The method of claim 12, wherein the condition is a defective primary subscriber unit.

19. The method of claim 12, wherein the condition is an optimization of the plurality of accessories, wherein the optimization of the plurality of accessories includes the communications server linking one of the plurality of primary subscriber units with a plurality of the plurality of accessories.

20. The method of claim 12, wherein the communication server is embodied in one or more of the plurality of primary subscriber units.

* * * * *